Patented June 26, 1934

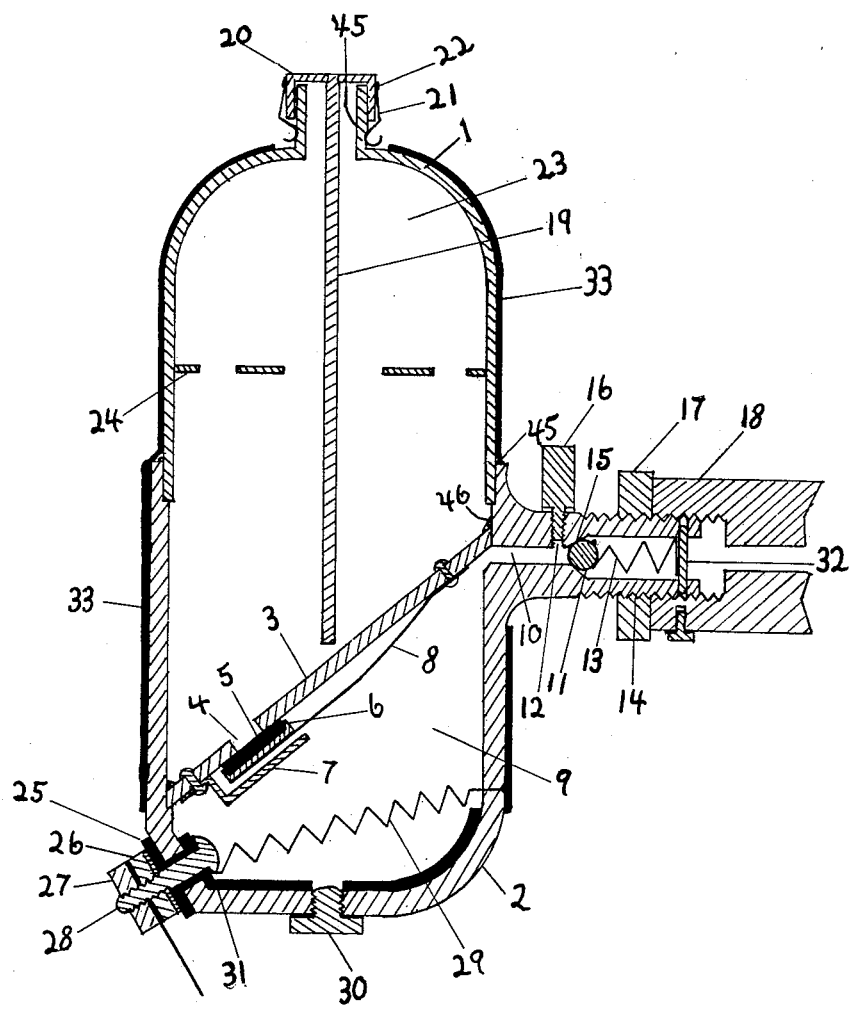

1,964,298

UNITED STATES PATENT OFFICE 1,964,298

OIL AND GREASE CUP

Oscar Theodore Nelson, Cleveland, Ohio

Application February 8, 1932, Serial No. 591,631

3 Claims. (Cl. 184—14)

The invention relates to improvements in oil cups and particularly to an electrically operated device that may be controlled on the instrument board of an automobile or likewise.

A further object is to provide a device of the character stated which will dispense a small amount of oil at an extremely high pressure.

A further object is to provide a device of the character stated that will dispense oil from a remote point as desired. A further object is to provide a resistance wire for the purpose of heating oil to such temperature that will operate my cup. A further object of my cup is that it recharges automatically after each operation. Another object is the provision of a lower reservoir having outlet means at the highest point which is very important in the operation of my cup.

Reference is now made to the accompanying drawing wherein is disclosed one embodiment of my invention. The single figure shown is a view in longitudinal section of my oil cup. The main body 2 has a top 1 soldered thereto as shown at 45. A partition 3 is provided to divide said body into 2 reservoirs, said partition being perforated at 4 for establishing communication between said reservoirs. A check valve 5 and spring 8 regulate the flow of oil from the upper reservoir 23 to the lower reservoir 9. A shield 7 is provided to prevent undue strain upon valve 5 and spring 8. A resistance wire 29 is held by binding screw 28 at one end and grounded to body 2 at the other. The binding screw is insulated from body 2 by a non-conducting washer 25 and fiber pad 31. Leading from the highest point in the lower reservoir is the passage 10, said passage having a check valve consisting of ball 11, spring 13 and pin 32. A threaded portion 14 is also provided for positioning the cup in operative position.

Leading from passage 10 is a threaded outlet 12 provided with a screw 16 for normally sealing the outlet. Said threaded outlet provides means for testing the operation and for releasing any air accumulated in the lower reservoir. Heat insulating material 33 is provided to keep the oil in the compartments warm. Drain plug 30 is also provided.

Top 1 is sweat soldered to body 2, partition 3 is soldered at 46 to said body and made air tight. A cap 20 is provided with a measuring rod 19, a perforated partition 24 is also provided to keep the oil more steady.

The operation is as follows:

A supply of lubricant is introduced into reservoir 23 until full. A force is then applied to oil which opens passage to lower reservoir 9, as oil enters lower reservoir the existing air is forced out through check valve 11. When oil is sighted either in bearing to be lubricated or in passage 12 by removing screw 16 the cup is completely filled for operating. The electric circuit required by resistance wire 29 consists of negative wire grounded either to the bearing or cup, and a positive wire clamped to screw 28 by nuts 26 and 27, said circuit may be closed from any point desired by a switch. When the current is applied resistance wire 29 heats the oil in the lower reservoir thereby expanding said oil and expelling an amount of oil according to the heat applied through passage 10 and check valve 11. When the current is turned off the oil contracts in reservoir 9 causing a vacuum which opens check valve 5 admitting the amount of oil from the upper reservoir equal to that previously expelled from the lower reservoir. This operation may be repeated until the upper reservoir 23 is empty.

I wish to call attention to the importance of having outlet passage 10 at the highest point in reservoir 9. This arrangement serves for expelling the existing air in said reservoir while filling. The maximum force and control of the volume of oil expelling depends largely on the complete elimination of air in the lower reservoir.

What I claim is:

1. A lubricating device of the character described comprising an upper reservoir and a lower reservoir, means for establishing communication between said reservoirs, a check valve in said means opening toward said lower reservoir, outlet means for the lower reservoir at the highest point thereof, a check valve in said outlet means, and means for heating the contents of the lower reservoir to expel a portion thereof.

2. A lubricating device as recited in claim 1, wherein the heating means is electrically operated.

3. A lubricating device as recited in claim 1, wherein the outlet means is provided with a relief means for testing the operation and for releasing any air accumulated in the lower reservoir.

OSCAR THEODORE NELSON.